United States Patent
Ho

[11] Patent Number: 5,240,594
[45] Date of Patent: Aug. 31, 1993

[54] SYSTEM FOR MONITORING AND/OR CONTROLLING LIQUID-SOLID SEPARATION PROCESSES

[75] Inventor: Bosco P. Ho, Pittsburgh, Pa.

[73] Assignee: Calgon Corporation, Pittsburgh, Pa.

[21] Appl. No.: 860,531

[22] Filed: Mar. 30, 1992

Related U.S. Application Data

[63] Continuation of Ser. No. 605,070, Oct. 29, 1990, abandoned, which is a continuation of Ser. No. 329,730, Mar. 28, 1989, Pat. No. 4,990,261, which is a continuation of Ser. No. 122,976, Nov. 19, 1987, abandoned.

[51] Int. Cl.$^5$ .................. C02F 11/14; B01D 33/04
[52] U.S. Cl. .................. 210/96.1; 162/258; 210/143; 210/205; 210/401
[58] Field of Search .............. 162/61, 198, 252, 258; 210/709, 739, 745, 96.1, 112, 103, 106, 143, 400, 401, 205, 206

[56] References Cited

U.S. PATENT DOCUMENTS

| | | | |
|---|---|---|---|
| 3,815,745 | 6/1974 | Bondarev et al. | 210/106 |
| 3,962,581 | 6/1976 | Zimmerman | 162/198 |
| 4,341,628 | 7/1982 | Fujinami et al. | 210/103 |
| 4,500,968 | 2/1985 | Bialkowski | 162/252 |
| 4,587,023 | 5/1986 | Srivatsa et al. | 210/744 |
| 4,612,123 | 9/1986 | Eustacchio et al. | 210/709 |
| 4,644,174 | 2/1987 | Ouellette et al. | 162/198 |
| 4,707,272 | 11/1987 | Kistler | 210/709 |
| 4,840,706 | 6/1989 | Campbell | 162/198 |
| 4,867,886 | 9/1989 | Botkins, Jr. | 210/709 |
| 4,976,871 | 12/1990 | Banks et al. | 210/709 |

FOREIGN PATENT DOCUMENTS

| | | | |
|---|---|---|---|
| 2266881 | 12/1975 | France | 210/103 |
| 60-3998 | 1/1985 | Japan | 210/106 |
| WO86/05525 | 9/1986 | PCT Int'l Appl. | 162/252 |
| 717479 | 10/1954 | United Kingdom | 210/709 |
| 2129549 | 5/1984 | United Kingdom | 210/709 |

Primary Examiner—Peter Hruskoci
Attorney, Agent, or Firm—W. C. Mitchell; M. C. Sudol

[57] ABSTRACT

A system for monitoring and/or controlling a liquid-solid separation process is described. The system utilizes photodetectors to view the surface of the composition being dewatered, and correlates the corresponding signals from the photodetectors to dryness values.

4 Claims, 2 Drawing Sheets

SYSTEM FOR MONITORING AND/OR CONTROLLING LIQUID-SOLID SEPARATION PROCESSES

This is a continuation of application Ser. No. 605,070 filed Oct. 29, 1990, now abandoned which is a continuation of Ser. No. 329,730 filed Mar. 28, 1989 (now U.S. Pat. No. 4,990,261) which is a continuation of Ser. No. 122,976 filed Nov. 19, 1987, now abandoned.

BACKGROUND OF THE INVENTION

This invention relates to an automatic monitoring and/or control system for liquid/solid separation processes, particularly dewatering processes wherein dewatering is aided by the addition of a dewatering aid such as a polymer or other flocculant. A method of monitoring and/or controlling separation performance is also disclosed.

More particularly, this invention relates to the use of one or more photodetectors to monitor the performance of a liquid/solid separation process and to adjust additive feedrates in accordance with the separation efficiency readings so obtained, thereby controlling liquid/solid separation performance.

Liquid/solid separation processes are used to effect the transition of a two-phase composition from an initial liquid/solid state, wherein the liquid:solid weight ratio is high (e.g., a dilute slurry), to a state where some portion of the liquid medium has been removed from the solid medium, thereby lowering the liquid:solid weight ratio to a second value. As this transition occurs, the surface appearance of the composition being dewatered changes, as does the amount of light reflected by the surface of the two-phase composition being treated changes as the liquid:solid weight ratio decreases.

One or more photo detectors can be used to detect variations in the intensity of light reflected by a stream being dewatered as the stream changes from its original, wet state, to a "dewatered" state. As used herein, the term "dewater" refers generally to the separation of a liquid phase from a liquid phase/solid phase composition. Use of this term does not imply that the liquid being separated is water, though in a majority of instances the liquid being removed is water.

If sufficient dewatering occurs to substantially remove free liquid, a "dry line" may appear somewhere across the surface of the material being dewatered. In such instances, one or more photodetectors can be used to monitor the location of the dry line. Thus, a liquid/solid composition may initially contain substantial free liquid. Prior to dewatering, the surface of such a composition may be mirror-like. As dewatering occurs, and free liquid is removed, the irregular surface of the solid material has different reflective properties than does the mirror-like surface of the wet composition, such distinct reflective properties can be readily discerned by photodetectors.

A photodetector can therefore be used to monitor and/or a control separation process by correlating signal variations, which are attributed to the intensity of the light viewed by the photodetector, to dewatering performance. For example, a high/low voltage signal from a photodetector can be used to advise an operator as to the location of a system's dry line relative to the location of a detector. Additionally, such a signal can be modified to a signal which is proportional to the amount of dewatering which has occurred up to the point on the dewatering surface where the photodetector reading is being made. In the broadest sense, the instant invention can be utilized to monitor and/or control any unit operation which acts on a composition so as to affect the reflective properties of the surface of the composition, if such destinations can be discerned by a photodetector.

As an example of an industrial application, a photodetector may be used to monitor a belt-filter press dewatering system and to control the flocculant feed rate to such a system. Polymers or other flocculants are added to enhance dewatering; for this reason, dewatering efficiency can be regulated by controlling additive dosage.

Additionally, the instant invention may be used to determine the drainage efficiency of paper pulp in a paper-making process, such as in the wet end forming section of a paper plant. Specific uses may be found relative to Fordrinier tables, twin-wire machines, cylinder machines and other sheet-forming equipment.

However, the instant invention may be used to monitor and/or control the operation of any liquid/solid separation process or apparatus, including, but not limited to drying processes, filtration processes (such as vacuum filtration) and gravity dewatering processes.

While all of these examples relate to suggested uses of the claimed invention, they are in no way intended to limit the scope of the instant invention.

It is therefore an object of this invention to provide a system for monitoring and/or controlling a liquid/solid separation process, particularly when the transition of the composition being treated from an initial state having a high liquid:solid weight ratio to a second state having a lower liquid/solid weight ratio is dependent upon a process variable such as the addition of a flocculant. The instant system controls additive dosage and/or other process variables, and thereby control separation performance.

A further object of this invention is to provide a system which controls and/or monitors a liquid/solid separation process by correlating a standard analog or digital signal from a photodetector to a signal which is proportional to dewatering efficiency.

A further object of this invention is to reliably monitor and/or control a liquid:solid separation process under varying feed conditions.

A further object of this invention is to measure the efficacy of a liquid/solid separation process instantaneously and accurately.

A further object of this invention is to quickly monitor and/or control liquid/solid separation system upsets.

A further object of this invention is to provide a monitoring and/or control system which is inexpensive and which is easily maintained.

A further object of this invention is to minimize flocculant consumption.

A further object of this invention is to control additives fed to dewatering processes wherein feedstream parameters, such as solids concentration, vary.

A further object of this invention is to maximize throughput of a separation process.

A further object of this invention is to improve the operability of systems which are difficult to control.

A further object of this invention is to reduce operator attention.

Still further, it is an object of this invention to control additive feedrates to belt-filter press dewatering systems.

Further objects will become apparent from the description which follows.

U.S. Pat. No. 4,587,023 discloses a method of monitoring and controlling belt press separation systems which utilizes a level detector, such as an ultrasonic level detector, to measure separation performance.

DETAILED DESCRIPTION OF THE INVENTION

Figure 1:
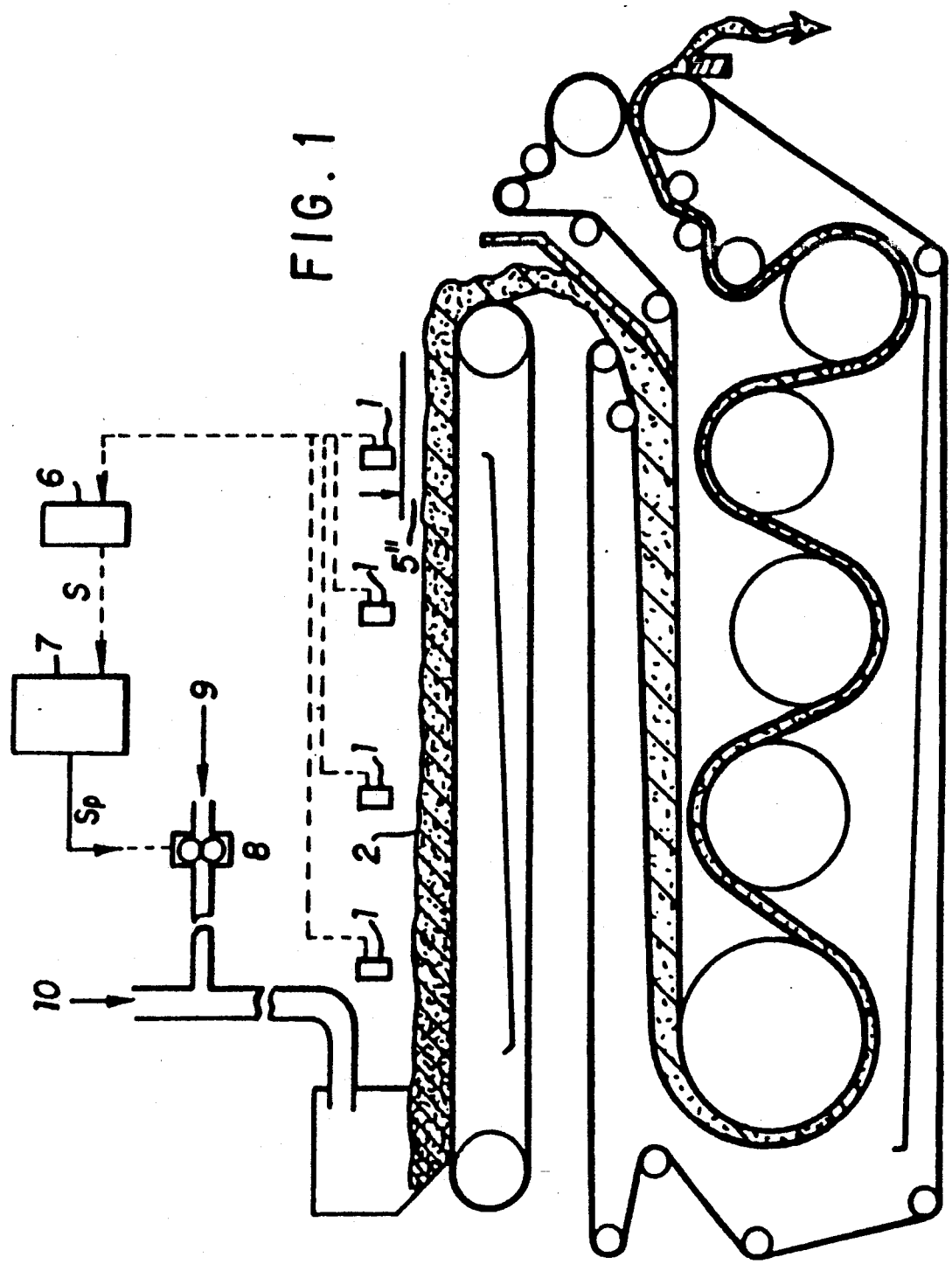
FIG. 1 illustrates the instant control system in conjunction with a belt-filter press.

The instant invention is directed to a method for monitoring and/or controlling a liquid/solid separation process wherein a two phase, liquid/solid composition having a composition surface and an initial liquid:solid weight ratio contacts a separation zone wherein a change from said initial liquid:solid weight ratio to a lower liquid:solid weight ratio occurs, said method comprising:
  a) positioning at least one photodetector in close proximity to said surface so as to enable said photodetector to view light reflected by said surface of said liquid/solid composition as it contacts said separation zone, and to generate an output signal in response to said view;
  b) correlating said output signal emitted from each photodetector in response to its view of light reflected from said composition surface to a dryness value (i.e., a liquid/solid weight ratio for said composition), thereby monitoring separation efficiency; and, optionally
  c) utilizing the output signal from each photodetector to control a process parameter affecting the performance of said liquid/solid separation process.

The instant invention is also directed to a system for monitoring and/or controlling a liquid/solid separation process, said system comprising: at least one photodetector; at least one light source; a process controller capable of utilizing a signal received from said photodetector(s) to control at least one receiving device. Each receiving device utilizes the signal from the controller to effect changes in and/or monitor separation performance.

Any photodetector can be used. For example, a photodetector which measures the intensity of a spot illuminated by a light source can be used. More particularly, the spot illuminated is a spot on the surface of the liquid/solid composition being dewatered which is "viewed" by the photodetector. The light source may be integral to the photodetector, or an independent light source may be used.

As liquid is separated from the composition, the intensity of light reflected by the surface of the composition varies. The photodetectors senses these variations.

The photodetector's output signal, which changes in response to the intensity of light viewed by the photodetector, may be either digital or analog. If analog, voltage, current, phase shift or frequency representation may be used. If digital, any binary or multi level transmission codes can be used. The simplest type of output signal is a bimodal signal.

Any solid-liquid separation process can be monitored and/or controlled using one or more photodetectors. For example, municipal waste streams, industrial water and process streams, mining streams and paper processing streams, among others, are dewatered and can be monitored and/or controlled using the instant system and method. The invention may be used with any liquid. Typical process equipment which can be monitored and/or controlled via the instant invention includes, but is not limited to, belt presses, filters (e.g., vacuum filters), dewatering screws and driers.

As used herein, the term "separation zone" refers to that portion, segment, area or space in a dewatering apparatus or process wherein the liquid of the liquid/solid composition being dewatered is separated or removed from the composition. According to this definition, any type of dewatering apparatus or process contains a separation zone.

In the simplest case, the instant invention utilizes a single photodetector to monitor and/or control a dewatering process. The photodetector is positioned so as to view the surface of the two phase liquid/solid composition being dewatered at a position in or outside of the separation zone where, under normal operating conditions, "free" liquid has been substantially removed. Thus, the photodetector is positioned to view a dewatered surface. The photodetector then provides an output signal (for example, a high voltage signal) corresponding to the light reflected from the dewatered surface. If, for some reason, normal dewatering does not occur, the intensity of light viewed by the detector changes due to the increased reflection from the surface of the material being dewatered (for example, to a low voltage signal), alerting operating personnel that modifications must be made to the dewatering process. Alternatively, the signal could be used to control an upstream variable, such as feedstream flow rate or the feedrate of a flocculant, so as to return separation performance to an acceptable level. In this application, the photodetector simply indicates whether or not sufficient dewatering has occurred up to the location of the photodetector; if not, changes are made to the process to move dewatering performance toward an acceptable level.

Preferably, a plurality of photodetectors is used. As the number of detectors increases, the surface of the composition being dewatered is viewed at an increased number of locations in and possibly after the dewatering zone. Such an arrangement allows a more accurate determination of dewatering performance, which in turn can be used to more accurately control the separation process.

A preferred photodetector, or photoelectric sensor, is a photodetector of the type that measures the gray scale of a spot illuminated by an integral lamp, preferably an incandescent lamp. A specific example of such a photodetector is a SICK Optic-Elektronic Photodetector, Model NT-8-06, having a No. 27 lens of 120 mm focal distance.

The photodetector should be positioned so as to properly view light reflected from the surface of the composition being dewatered. For the SICK Model NT-8-06, the inventor determined that the detector should be located approximately 2 to 8 inches, preferably 4 to 6 inches, above the surface of the stream being dewatered. The lighted spot for this detector is approximately ⅜" in diameter, if the detector is positioned properly.

During operation, the lenses of the detectors should be kept reasonably clean, since dirt or any other contaminant on a lens surface may give a false reading. For hard to reach areas, fiber optic extensions for the lenses may be used.

Generally, commercially available photodetectors generate bi-modal output signals, such as high/low voltage signals, in response to the intensity of light reflected back to the sensor. For example, a high voltage signal may be transmitted when the photodetector detects a "dry" surface area and a low voltage signal may be transmitted for a wet surface, or vice versa. Thus, under normal operating conditions, the signal transmitted will switch as the detector is moved from the wet end to the dry end. One having normal skill in the instrumentation art will easily be able to position the photodetector(s) properly relative to normal operations so as to provide meaningful signals and to calibrate output signals from the photodetector(s).

The inventor has discovered that a low pass signal filtering device producing an effect equivalent to a first order time lag may be used to convert a bi-modal high/low voltage signal transmitted by a photodetector to a steady signal which is proportional to the dryness of the material being viewed by the detector. Low pass filtering can be performed by either analog circuits or digital electronics. The proportional signal produced in this manner correlates empirically to a "dryness" percentage, which can be monitored by a plant operator and used to control performance of a dewatering system. Thus, the filtered signal can be sent to a controller, such as a microprocessor-based controller, which in turn can be used to send signals to one or more output devices which allow monitoring and control of dewatering processes.

Automatic control of a separation process allows continuous and precise control of the process while minimizing the use of additives such as polymers added to enhance separation. The separation process and the controller form an action/response loop; photodetectors transmit process information to the controller, which utilizes this feedback to adjust the process so as to maintain the monitored process parameter near a desired setpoint. Any type of controller can be used in conjunction with the instant method. A preferred controller is a proportional integral derivative (P-I-D) feedback controller. This type of controller utilizes the difference between the measured "dryness" of the material being dewatered and a set point. The deviation causes the controller to adjust a process parameter so as to reduce the deviation. In a typical separation process, such as a belt press operation, the parameter to be adjusted may be the feedstream flowrate or the polymer/flocculant dosage. However, the output from the controller may be used to regulate any parameter impacting on deviation between the dryness, as measured by the photodetector, and the set point.

Thus, the instant invention is also directed to a system for controlling a separation process. The control algorithm for adjusting the polymer feedrate to a liquid/solid composition which will be dewatered uses standard automatic feedback control methods known in the art. Standard process controllers, such as a Powell Micon P-100 controller or a Foxboro Model 760 controller, can be used.

The instant control system for liquid/solid separation processes comprises:
a) at least one light source;
b) at least one photoelectric detector;
c) a process controller; and
d) at least one output device, such as a flocculant feed pump and/or a monitoring instrument.

This system can be utilized with any liquid/solid separation process or apparatus wherein a liquid is separated from a liquid/solid composition. The system is set up so that the photodetector views light reflected from the surface of the liquid/solid composition being dewatered, preferably in the separation zone. The output signal from the photodetector is converted to or is a proportional dryness signal, which is fed to a process controller. The process controller controls an output device, such as a polymer feed pump, thereby adjusting process parameters, such as the amount of flocculant fed to the liquid:solid stream being treated, so as to minimize the deviation between the actual dryness and a dryness set point and to optimize the separation process.

Figure 2:
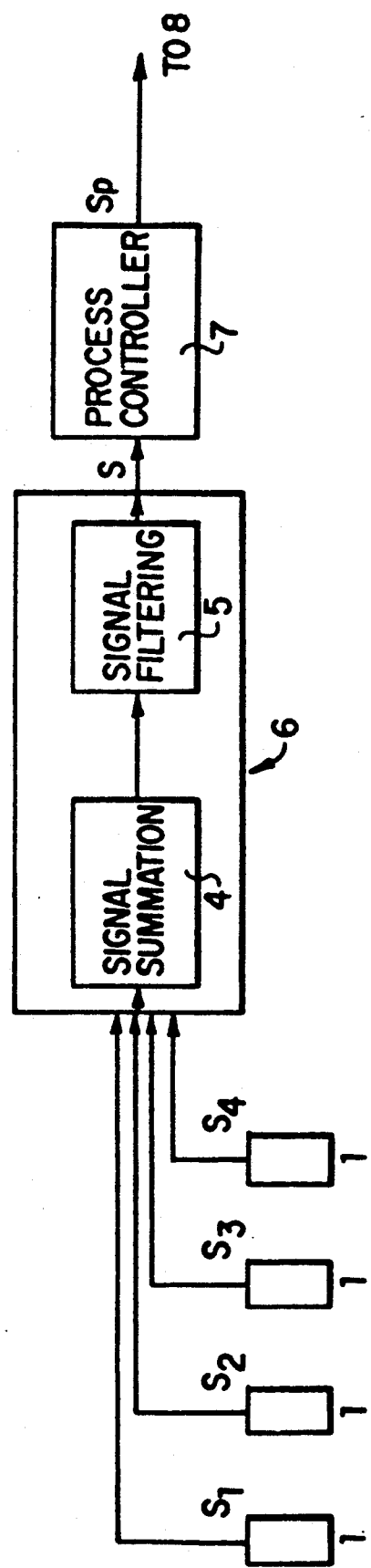
FIG. 2 shows a functional block diagram for the system of FIG. 1.

A typical control system for a belt-press dewatering device is illustrated in FIGS. 1 and 2. This system, which represents a preferred embodiment of the instant invention, was successfully operated on a belt filter press used to dewater sludge in a municipal sewage treatment plant and on a belt filter press used to dewater paper waste in a paper mill.

The control system utilizes four photodetectors (1), which are wired for power and signal transmission. The photodetectors are of the gray scale type, and contain integral incandescent light sources (not shown). Each photoelectric sensor is positioned 4 to 6 inches above the surface of the sludge being dewatered (2) in the gravity dewatering zone of the belt-filter press (3). Output signals ($S_1$–$S_4$) at either $V_1$ (4.5 volts, closed contact for a wet surface) or $V_o$ (0.7 volt, open contact for a dry surface) from the photodetectors (1) are summed in the signal summation unit (4) and sent to the signal filtering unit (5) of signal conditioning module (6), which converts the summed bimodal photodetector signals to a filtered signal (S) utilizing a first order time lag with a time constant of 5–30 seconds. This signal (S) is then transmitted to a process controller (7). Process controller (7) is a P-I-D feedback controller with variable gain which performs automatic control functions on the separation process. The signal output from the process controller (Sp) is used to regulate a variable flow polymer feed pump (8). Thus, the system automatically controls the polymer (9) fed to the untreated sludge (10) so as to minimize the deviation between the measured dryness and the set point dryness, irrespective of variations in feed rate, solids density etc. The controller output signal can also be transmitted to monitoring instruments.

FIG. 2 shows a functional block diagram for the same liquid/solid polymer dosage control system. The numbering described above applies to FIG. 2 as well. It is noteworthy that an automatic controller may integrally filter signals from the photodetectors for the PID feedback control functions. The controller output signal may drive a polymer feed pump, a monitoring device or control any other parameter affecting dewatering performance.

What is claimed is:
1. A belt press dewatering system comprising: a) a belt press dewatering device having a gravity dewatering zone; b) a liquid/solid composition having a surface and an initial liquid:solid weight ratio, wherein said composition contacts said gravity dewatering zone wherein a change from said initial liquid:solid weight ratio to a lower liquid:solid weight ratio occurs; c) at least one photodetector; d) at least one light source; e) a process controller; wherein said photodetector(s) is (are) positioned in close proximity to and above said surface in said gravity dewatering zone so as to enable said photodetector(s) to view light from said light source(s) reflected by said surface of said liquid/solid composition in said gravity dewatering zone and to generate an output signal in response to said view proportional to said change; and (f) means for utilizing said output signal by said process controller to monitor and-/or control said belt press dewatering device, wherein each of said photodetectors is a gray scale detector containing an integral light source.

2. The system of claim 1, wherein said output signal is a bi-modal signal.

3. The system of claim 1, wherein said output signal is an analog signal.

4. The system of claim 1, wherein said gravity dewatering zone includes a plurality of photodetectors.

* * * * *